3,150,726
DRILLING MUD AND METHOD OF USE
Oliver K. Bodine, Bartlesville, Okla., assignor to Phillips Petroleum Company, a corporation of Delaware
No Drawing. Filed July 22, 1960, Ser. No. 44,557
7 Claims. (Cl. 175—72)

This invention relates to a drilling mud having an improved lost circulation control property. In another aspect it relates to the preparation and use of a drilling mud incorporating thermoplastic coated particulate solids, like diatomaceous earth, to combat the problem of lost circulation of drilling fluids and other aqueous and/or non-aqueous liquids utilized in drilling, operating, or treating earth boreholes.

In the art of drilling wells, especially drilling by the rotary method, it is necessary to use a drilling mud, as is well understood in the art. The drilling mud performs many functions necessary to successful completion of the well being drilled. The drilling mud, in addition to performing other functions, lubricates the drill stem, carries the cuttings to the surface of the well, and forms a filter cake on the walls of the well preventing loss of at least any substantial amount of water from the drilling mud to the natural formations in the well. The weight of the mud prevents blowouts of formation pressures, especially when weighting agents are employed. In order to perform these important functions properly, the drilling mud must have suitable viscosity and other qualities at all times in spite of adverse conditions encountered in drilling the well. Thixotropic properties of the mud support the cuttings during any time the pumps are shut down.

The problem of combatting lost circulation has been long recognized and various attempts have been made to solve the problem which have resulted in various remedial procedures. A common method of preventing fluid loss from a borehole comprises incorporating in the fluid a comminuted solid which filters out as the fluid passes from the borehole into a permeable stratum penetrated by the borehole, thereby forming a filter cake on the face of the stratum which retards the passage of liquid therethrough. However, the problem has not been completely solved as the materials proposed as additives to well fluids are deficient in some respects. Some materials are much too dense while others are of such low density that they readily float in the well fluids. The dense materials tend to settle out of the liquid suspension thereby rendering the effective distribution of the material in the well liquid involved extremely difficult. Some materials are difficult to wet and place in suspension while others wet readily and lose their strength and effectiveness. With some materials the individual particles tend to agglomerate and the resulting agglomeration renders them relatively useless, particularly, when the well liquid is circulated through pumps, drill bits, screens, etc.

A broad aspect of this invention comprises suspending a particulate solid, such as diatomaceous earth, coated with a thermoplastic polyolefin, in a well fluid to provide a concentration of the coated material in the range of 0.1 to 15 weight percent of the fluid with the particle size ranging from about 50 mesh to about ⅜ inch in any one dimension. The percentages of coated particles given in the specification is based on weight percent. In field use, it is usually expressed as concentration in pounds per barrel. Thus, the same quantity would be used in a light weight or a heavy weight mud, but the weight percent would be greatly different. Quantities used in the field may vary from about one pound per barrel up to as much as 50 pounds per barrel. The larger figure is rare. The lower range of 1–5 pounds per barrel is frequently used as a preventative to avoid loss of circulation by correcting hole conditions before returns are lost.

Preferably, the lost circulation material will have a range of sizes to include some of the largest, some of the smallest, as well as intermediate size particles. It is to be recognized that the smallest particles may not retain enough heat to acquire a really good coating, but this will not be injurious to the final product because the finer particles will not degrade to the same degree as the large particles, and, as has been pointed out, a certain percentage of the smaller particles are necessary to the plugging operation. By treatment with such a plastic, the diatomaceous earth can be rendered more water repellent and made to withstand still greater periods of circulation than is possible when used uncoated. The viscosity of the drilling mud is increased much less where the diatomaceous earth has been coated with plastic. Furthermore, in relatively hot bottom holes, the plastic will become tacky, causing the particles of lost circulation material to adhere to one another under bottom hole conditions, thus improving their efficiency.

It is, therefore, an object of this invention to provide an improved method of combatting loss of liquid from an earth borehole when drilling or otherwise treating the borehole.

Another object is to provide a method for drilling an oil well bore having various permeabilities and irregular fissures without deleterious effect upon the drilling mud used.

A further object is to provide a lost circulation agent or additive for drilling liquids, which is tough, water-insoluble, non-abrasive, chemically inert and capable of laying down a bed on which the mud can build a good filter cake and thus inhibit fluid loss from the mud to the porous formation.

Other objects and advantages of this invention will become apparent to those skilled in the art upon studying the accompanying disclosure and appended claims.

In carrying out the invention, the particulate solid may be plastic-coated in accordance with the process of copending U.S. application of O. D. Edwards, Serial No. 766,451, filed October 10, 1958 and now Patent No. 2,976,253. This application discloses an apparatus comprising a fluidized bed for the coating of hot catalyst pellets with powdered polyethylene.

It can be readily adopted in the instant method by substituting a comminuted particulated material, such as pulverized diatomaceous earth, for the catalyst pellets. This solid may be coated with almost any powdered thermoplastic plastic. Other synthetic resins which will soften only under the temperatures encountered at the bottom of a borehole, and suitable for use in lieu of the polyolefins are: cellulose acetate having in the neighborhood of 60% combined acetic acid, such as type TH–4 or TH–5 distributed by Hercules Powder Company, and resulting in a coating having a melting range between 235° C. and 270° C.; polystyrene, such as Styron sold by the Dow Chemical Company, and polyvinyl chloride, such as Bakelite brand supplied by Union Carbide Corporation for use in relatively cold wells, that is those wells whose bottom hole temperature is well below 200° F.

The diatomaceous earth to be used in this invention is a naturally occurring mineral composed of the skeleton remains of microorganisms. This material is generally mined as a chalky solid or powder. There are also deposits where the mineral is mined in a hard granular form. When this material is ground to the proper size, it has the physical properties necessary for a lost circulation material. Diamtomaceous earth, as mined, contains a high percentage of water by weight. It is usually dried in kilns. These kilns operate at about 500–600° F. Diatomaceous earth is frequently calcined before shipment to the consumer. Calcining is carried out at a high temperature with a maximum of 2200° F. With proper process control this invention moves the particles from the drying or calcining kilns through coolers (if necessary) and directly into the fluidized bed coating apparatus. Alternatively, cold raw material is heated to the necessary temperature for coating. It has previously been indicated that these coated particles should range in size from 50 mesh to ⅜ inch. The uncoated diatomaceous earth has a low bulk density and has only enough abrasion resistance to withstand very short periods of use, while combatting lost circulation.

As indicated above, the protective coating of this invention is a normally solid polymer of at least one thermoplastic synthetic resin such as a polyolefin, and is preferably an ethylene polymer, either polyethylene or a copolymer of ethylene with propylene and/or 1-butene. Methods of preparing such polyolefins are available in the art. Polyethylene prepared by the Fawcett process employing extremely high pressures, i.e., over 500 atmospheres, can be used. I prefer, however, for maximum strength of the coated pellet to use a high density polymer prepared by one of the low pressure processes, preferably that described by the patent to J. P. Hogan et al., U.S. 2,825,721. Polymerization processes employing organometallic catalyst systems can also be used. Such processes are described in the copending U.S. applications of H. D. Lyons and Gene Nowlin, Serial No. 495,054, filed March 17, 1955, and J. A. Reid, Serial No. 494,281, filed March 14, 1955 and now abandoned. Polymers which are preferred have a density at 25° C. of at least 0.95 gram per cubic centimeter and ranging up to 0.98 gram per cc., and a crystalline freezing point of at least 250° F. These high density polymers are quite rigid and have good abrasion resistance so that when coated upon a catalyst pellet, the product has considerable mechanical strength and moisture resistance.

Density determinations should be made on polymer samples which are compression molded at 300° F., cooled to 250° F. over a 10 minute period and then cooled to room temperature in about 8 minutes. The freezing point of crystalline polymers refers to the plateau or inflection point in the cooling curve of the polymer.

I prefer to coat the particulate solids with an ethylene polymer by passing solids at a temperature in the range of about 380 to 450° F., preferably not over about 425° F., through a fluidized bed of powdered polymer. The solids particles can be cooled from their final drying temperature, about 1000° F., to a suitable coating temperature, and then passed through the fluidized bed wherein they become coated with a thin film of the polymer, which fuses into a continuous coating about each particle because of the heat in the particles. The fluidized bed can have provision for continuous addition of polymer to make up for that which is removed on the solids. The hot coated solids are dropped through the bed and removed by suitable means at the lower end of the fluidized bed. A porous plate through which fluidizing gas passes into the polymer bed can be tilted so that the coated particles are directed to a withdrawal conduit. Alternatively, a sloping screen can be positioned in the lower portion of the bed to intercept the coated solids and direct their removal from the fluidized bed. Since the particulate solids are larger and heavier than the particles of polymer which are fluidized, the solids readily pass through such a bed by gravity without interfering with the fluidized condition of the polymer. The film which is applied to the particulate material should be at least one-half mil in thickness and generally should not exceed 10 mils in thickness for even the largest solids. Normally the film applied in a fluidized bed coating process will have a thickness of about 1 to 4 mils. The fluidized polymer will be very finely ground, have a screen size of approximately 100 to 140 mesh, and the particulate solids will ordinarily be irregular in shape with a maximum dimension of about ⅜ inch. It is best to employ the lowest possible temperature required for the solid to fuse an adequate film of polymer on its outer surface so that the particles, after coating, can be removed from the bed with a minimum of agglomeration. By controlling the temperature of the gas fluidizing the polymer bed, hot particulate solids at about 380–425° F. can be coated immediately upon entering the bed and cooled to about 250° F. by the time they leave the fluidized bed. A cooling step which reduces the temperature of the coated solids to below 250° F. should be provided before they are permitted to accumulate in a container or otherwise come in contact with each other to any great extent. In this way agglomeration of the coated solids can be avoided.

The resulting resinous coated diatomaceous earth will keep the particles from absorbing water, and thus becoming soft and disintegratable under the severe conditions found in the drilling bit area. Moreover, above ground, the particles treated according to this invention will maintain their separation, and thus achieve the good dispersion in the drilling fluid. On the other hand, since the coating is composed of a thermoplastic, it will soften and become tacky at bottom hole temperatures. The resulting adhesive causes a build up of particles that improves their lost circulation control efficiency at the very place where needed. By selection of polymers having different melting points, the coated product can be made to become tacky at different temperatures. Thus one polymer may be more useful in shallow wells while another will be useful in deep wells where higher temperatures are encountered.

The invention is generic in its applicability to any particulate solid, i.e., any solid relatively small in all dimensions, regardless of shape or composition. "Particulate" as used here defines particles ranging from 50 mesh upward to those even as large as ⅜" in longest dimension or even larger.

As indicated previously, the particulate solid is preferably diatomaceous earth, any fairly good grade of the same being suitable. The "Celite" brand of diatomaceous earth is preferred but any technical grade of diatomaceous or infusorial earth such as kieselguhr, guhr, diatomite, tripolite, telurine, terra silicea, ceyssatite, or fossil flour may be employed. In addition somewhat inferior but nevertheless valuable results may be obtained by the practice of this invention by employing other porous aggregates such as pumice, vermiculite, exfoliated vermiculite, popped pumice, and other light weight aggregates known to the prior art in amounts similar to those given above for diatomaceous earth (Celite).

Diatomaceous earth has a specific gravity of 1.9–2.35, but the apparent density of diatomaceous earth in dry block form is 20 to 40 pounds per cubic foot. In the samples of calcined diatomaceous earth which were coated by placing in a beaker with molten polyethylene, the resultant product had an apparent specific gravity of about 1. This was considered desirable because it had no pronounced tendency to sink or float in water. It is thought that some of the polyethylene actually was absorbed into the pores of the diatomaceous earth particles in order to achieve this result.

A lost circulation material of specific gravity=1 is nearly ideal for many cases of combatting lost circulation. In the Texas Panhandle, for example, severe lost circulation is encountered at relatively shallow depths. Drilling muds of low weight (8.3–9.0 pounds per gallon) are commonly used in this area. Thus the coated diatomaceous earth could be suspended easily in such a mud. In one method, the coated material is introduced into the bore hole and admixed therein with the drilling fluid. In another embodiment, the coated particulate solids are admixed with an aqueous drilling fluid in a mud tank, the resulting mixture being agitated so as to maintain a dispersion of the coated particulate solids in the drilling fluid. Moreover, these muds are cleaned of drilled solids by passing the mud through a cyclone. The light weight lost circulation material will pass out the overflow of the cyclone along with the drilling mud while the heavier drilled solids will be discharged from the apex of the cone with little or none of the lost circulation material.

Various modifications and alterations of this invention will become apparent to those skilled in the art without departing from the scope and spirit of this invention and it should be understood that the latter is not necessarily limited to the aforementioned discussion.

I claim:

1. A process for combatting lost circulation of drilling fluid through the wall of a borehole into a surrounding formation wherein said fluid is circulated through a drill bit drilling in the bottom of said borehole and along said wall of said borehole, which comprises introducing into said borehole and admixing with said drilling fluid therein particulate solids continuously coated with thermoplastic resin selected from the group consisting of polyethylene, polypropylene, a copolymer of ethylene and propylene, a copolymer of ethylene and 1-butene, and a copolymer of ethylene, propylene, and 1-butene, said particulate solids being selected from the group consisting of diatomaceous earth, pumice, vermiculite, exfoliated vermiculite, and popped pumice, the concentration of said coated solids being in the range of about 0.1 to 15 weight percent of said drilling fluid.

2. The process of claim 1 wherein said drilling fluid is an aqueous weighted drilling fluid.

3. The process of claim 1 wherein said thermoplastic is polyethylene having a density in the range of 0.95 to 0.98.

4. A process for combatting lost circulation of drilling fluid through the wall of a borehole into a surrounding formation wherein said fluid is circulated through a drill bit drilling in the bottom of said borehole and along said wall of said borehole, which comprises admixing particulate solids continuously coated with thermoplastic with an aqueous drilling fluid in a mud tank to provide a concentration of said coated solids in the range of 0.1 to 15 weight percent, said thermoplastic being selected from the group consisting of polyethylene, polypropylene, a copolymer of ethylene and propylene, a copolymer of ethylene and 1-butene, and a copolymer of ethylene, propylene and 1-butene, agitating the resulting mixture so as to obtain a dispersion of said coated solids in said fluid, and circulating said fluid containing said coated solids dispersed therein through said borehole and said drill bit to flush cuttings from said borehole and prevent lost circulation through said wall.

5. The process of reducing loss of a liquid through the wall of an earth borehole in which said liquid is introduced, which comprises suspending in said liquid in said borehole, at a concentration in the range of 0.1 to 15 weight percent, particulate solids continuously coated with a solid thermoplastic selected from the group consisting of polyethylene, polypropylene, a copolymer of ethylene and propylene, a copolymer of ethylene and 1-butene, and a copolymer of ethylene, propylene and 1-butene, said particulate solids being of various size in the range of 50 mesh to ⅜ inch, so as to reduce the loss of liquid from said borehole, said solids being selected from the group consisting of diatomaceous earth, pumice, vermiculite, exfoliated vermiculite and popped pumice.

6. A process for combatting lost circulation of drilling fluid through the wall of a borehole in a surrounding formation wherein said fluid is circulated through a drill bit drilling in the bottom of said borehole and along the wall of said borehole, which comprises introducing into said borehole and mixing with said drilling fluid therein particulate solids continuously coated with thermoplastic selected from the group consisting of polyethylene, polypropylene, a copolymer of ethylene and propylene, a copolymer of ethylene and 1-butene, and a copolymer of ethylene, propylene and 1-butene, said solids being selected from the group consisting of diatomaceous earth, pumice, vermiculite, exfoliated vermiculite and popped pumice, the concentration of said coated solids in said fluid being sufficient to permit at least some of said coated solids to adhere to one another at the bottom hole temperatures encountered.

7. A drilling fluid comprising a liquid medium and a lost circulation control agent comprising particulate solids continuously coated with thermoplastic selected from the group consisting of polyethylene, polypropylene, a copolymer of ethylene and propylene, a copolymer of ethylene and 1-butene, and a copolymer of ethylene, propylene and 1-butene, said solids being selected from the group consisting of diatomaceous earth, pumice, vermiculite, exfoliated vermiculite and popped pumice.

References Cited in the file of this patent

UNITED STATES PATENTS

| | | |
|---|---|---|
| 2,631,017 | Gibson et al. | Mar. 10, 1953 |
| 2,648,522 | Armentrout | Aug. 11, 1953 |
| 2,650,195 | Cardwell et al. | Aug. 25, 1953 |
| 2,786,531 | Mangold et al. | Mar. 26, 1957 |
| 2,836,555 | Armentrout | May 27, 1958 |
| 2,912,380 | Groves | Nov. 10, 1959 |
| 2,923,151 | Engle et al. | Feb. 2, 1960 |
| 2,924,277 | Shell et al. | Feb. 9, 1960 |
| 3,026,938 | Huitt et al. | Mar. 27, 1962 |